(12) United States Patent
Huo et al.

(10) Patent No.: US 10,501,355 B2
(45) Date of Patent: Dec. 10, 2019

(54) METHOD FOR TREATING AND RECYCLING ORGANIC WASTEWATER AND APPARATUS

(71) Applicant: CHINESE RESEARCH ACADEMY OF ENVIRONMENTAL SCIENCES, Beijing (CN)

(72) Inventors: Shouliang Huo, Beijing (CN); Jingtian Zhang, Beijing (CN); Beidou Xi, Beijing (CN); Li Zhang, Beijing (CN); Chunzi Ma, Beijing (CN); Zhuoshi He, Beijing (CN); Qiuling Dang, Beijing (CN); Hong Yu, Beijing (CN)

(73) Assignee: CHINESE RESEARCH ACADEMY OF ENVIRONMENTAL SCIENCES, Beijing (CN)

(*) Notice: Subject to any disclaimer, the term of this patent is extended or adjusted under 35 U.S.C. 154(b) by 0 days.

(21) Appl. No.: 16/081,378

(22) PCT Filed: May 3, 2016

(86) PCT No.: PCT/CN2016/080860
§ 371 (c)(1),
(2) Date: Aug. 30, 2018

(87) PCT Pub. No.: WO2017/161640
PCT Pub. Date: Sep. 28, 2017

(65) Prior Publication Data
US 2019/0084858 A1  Mar. 21, 2019

(30) Foreign Application Priority Data

Mar. 22, 2016 (CN) .......................... 2016 1 0164427

(51) Int. Cl.
*C02F 9/00* (2006.01)
*C02F 1/52* (2006.01)
(Continued)

(52) U.S. Cl.
CPC ................. *C02F 9/00* (2013.01); *C02F 1/441* (2013.01); *C02F 1/442* (2013.01); *C02F 1/52* (2013.01);
(Continued)

(58) Field of Classification Search
CPC ....................................................... C02F 9/00
See application file for complete search history.

(56) References Cited

FOREIGN PATENT DOCUMENTS

CN         1623651 A       6/2005
CN       103130379 A       6/2013
(Continued)

OTHER PUBLICATIONS

International Search Report, dated Dec. 28, 2016, for International Application No. PCT/CN2016/080860, 2 pages.
(Continued)

*Primary Examiner* — Peter Keyworth
(74) *Attorney, Agent, or Firm* — Seed IP Law Group LLP (57) ABSTRACT

The present application provides a method for treating and recycling organic wastewater, comprising: 1) pretreating the organic wastewater; 2) subjecting an effluent obtained after pretreatment in step 1 to a heterogeneous Fenton reaction with Hangjin clay-supported nano-$Fe_3O_4$ as a catalyst, separating the catalyst from a reaction solution after completion of the reaction, and subjecting the reaction solution to a reaction to remove COD; 3) subjecting an effluent obtained in step 2 to an anaerobic ammonia oxidation reaction to denitrify by ammonia nitrogen reacting with nitrite nitrogen; 4) subjecting an effluent obtained in step 3 to an aerobic microbial decomposition and ultrafiltration membrane separation to remove COD and ammonia nitrogen; 5) filtering an effluent obtained in step 4 to remove large particles; 6) supplying an effluent obtained in step 5 to an RO system, and using an effluent from the RO system as circulating cooling
(Continued)

water, and subjecting concentrated water from the RO system to a softening treatment; and 7) supplying softened concentrated water obtained in step 6 to an NF system for treatment, evaporating an effluent obtained after the treatment to recover NaCl, and returning a resulting concentrated water to step 1. The present application also provides a device for implementing the method for treating and recycling an organic wastewater.

11 Claims, 3 Drawing Sheets

(51) Int. Cl.
| | | |
|---|---|---|
| | C02F 1/72 | (2006.01) |
| | C02F 1/44 | (2006.01) |
| | C02F 101/16 | (2006.01) |
| | C02F 103/36 | (2006.01) |
| | C02F 103/34 | (2006.01) |
| | C02F 3/02 | (2006.01) |

(52) U.S. Cl.
CPC .............. *C02F 1/725* (2013.01); *C02F 3/025* (2013.01); *C02F 2101/166* (2013.01); *C02F 2103/343* (2013.01); *C02F 2103/365* (2013.01); *C02F 2209/08* (2013.01); *C02F 2305/026* (2013.01)

(56) References Cited

FOREIGN PATENT DOCUMENTS

| | | |
|---|---|---|
| CN | 103230796 A | 8/2013 |
| WO | 2013/185350 A1 | 12/2013 |

OTHER PUBLICATIONS

Wang et al., "Removal of phosphorus from aqueous solutions by granular mesoporous ceramic adsorbent based on Hangjin clay," *Desalination and Water Treatment* 57:22400-22412, 2016. (15 pages).

Zhang et al., "Study on the Isomerization Reaction of Turpentine Oil Catalyzed by the Acid-treated HangJin 2# Clay," *Asia-Pacific Energy Equipment Engineering Research Conference (AP3ER 2015)*, Zhuhai, China, Jun. 13-14, 2015, pp. 265-268.

METHOD FOR TREATING AND RECYCLING ORGANIC WASTEWATER AND APPARATUS

TECHNICAL FIELD

The present application belongs to the field of industrial wastewater treatment, and particularly relates to a method for treating and recycling high-salt, high-ammonia nitrogen, high-concentration refractory organic wastewater.

The present application also relates to a device for implementing the above method.

BACKGROUND

With the rapid development of society and economy and the improvement of people's living standards, the problem of water environment pollution has increasingly attracted widespread attention in society. Over the past decades, technological advances and the accumulation of experience have resulted in the effective treatment of conventional domestic sewage. However, due to the complex composition and stable molecular structure of refractory organic contaminant in industrial wastewater, the use of conventional biochemical processing techniques is difficult to meet the emission standards. In particular, the treatment of high-salt, high-ammonia nitrogen, and high-concentration refractory organic wastewaters still needs constant exploration and research. In addition, as the emission standards increase and the cost of water increases, the reuse of treated wastewater becomes increasingly important.

From the perspective of sources, the high-salt, high-ammonia nitrogen, and high-concentration refractory organic wastewater mainly come from industries such as synthetic pharmaceuticals, pesticide production, papermaking black liquor, tannery wastewater, monosodium glutamate production, petroleum refining, and coal chemical industries. From the perspective of structure and characteristics, refractory organics mainly include: polycyclic aromatic hydrocarbons, heterocyclic compounds, chlorinated aromatic compounds, organic cyanides, organic synthetic polymer compounds, and so on. The degradation mechanism of these compounds is to change their molecular structures through oxidation, reduction, co-metabolism and other mechanisms and gradually to transform into small molecules. Therefore, wet catalytic oxidation, supercritical oxidation, Fenton treatment, ozone oxidation and other technologies can be used to deal with refractory organics, but in the case of high ammonia nitrogen concentration, the subsequent use of traditional anaerobic or aerobic process is difficult to achieve the denitrification requirements. In addition, due to the high concentration of organic matter, when multi-effect evaporation or reverse osmosis treatment is used, the evaporator is likely to be clogged or the membrane is fouled, resulting in difficult cleaning and increased processing costs.

Fenton technology is a commonly used advanced oxidation technology, and is often used to treat high-concentration refractory organic wastewater, such as dye wastewater, phenolic wastewater, acrylonitrile wastewater, papermaking black liquor, landfill leachate, and so on. However, whether a standard Fenton reagent or a modified Fenton reagent is used, it is required to have a normal effect at a pH of 3-5. Non-homogeneous Fenton technology can produce more HO. by loading the iron catalyst onto the substrate even under neutral pH conditions, thereby avoiding excessive salinity due to the addition of a alkali to adjust the pH prior to subsequent biological treatment. After the COD is lowered, the denitrification treatment needs to supplement the carbon source, resulting in cost increase. Anaerobic ammonia oxidation technology can effectively solve this problem by denitrifying with nitrate or nitrite as electron acceptors.

SUMMARY

The purpose of the present application is to provide a method for treating and recycling high-salt, high-ammonia nitrogen, high-concentration refractory organic wastewater.

A further object of the present application is to provide a device for implementing the above method.

In order to achieve the above object, the present application combines a heterogeneous Fenton process, an anaerobic ammonia oxidation process, and a membrane treatment process to treat high-salt, high-ammonia nitrogen, high-concentration refractory organic wastewater.

Further, the method for treating and recycling high-salt, high-ammonia nitrogen, high-concentration refractory organic wastewater provided by the present application is as follows:

1) pretreating the organic wastewater and adding flocculant to remove suspended solids and colloidal substances in the water;
2) subjecting an effluent obtained after pretreatment in step 1 to a heterogeneous Fenton reaction with Hangjin clay-supported nano-$Fe_3O_4$ as a catalyst, separating the catalyst from a reaction solution after the completion of the reaction, and subjecting the reaction solution to a reaction to remove COD and nitrogen;
3) subjecting an effluent obtained in step 2 to an anaerobic ammonia oxidation reaction to remove nitrogen by reaction of ammonia nitrogen and nitrite nitrogen;
4) subjecting an effluent obtained in step 3 to an aerobic microbial decomposition and ultrafiltration membrane separation to further remove COD and ammonia nitrogen;
5) filtering an effluent obtained in step 4 to remove large particles;
6) supplying an effluent obtained in step 5 to an RO system, and using an effluent from the RO system as circulating cooling water while subjecting the concentrated water from the RO system to a softening treatment; and
7) supplying the softened concentrated water obtained in step 6 to an NF system for treatment, evaporating an effluent obtained after the treatment to recover NaCl, and returning the resulting concentrated water to step 1.

In step 1 of the method according to the present application, the salinity of the organic wastewater is 3%-10%; and the ammonia nitrogen concentration is 1000-2500 mg/L; the COD concentration is 2000-5000 mg/L; and the flocculant is polyacrylamide.

In step 2 of the method according to the present application, the pH of the heterogeneous Fenton reaction is between 6.5-7.5; the nano-$Fe_3O_4$ particles in the catalyst are evenly distributed on the surface and in the pore of Hangjin clay in a monodispersed form; after the completion of reaction, the catalyst is concentrated at the bottom of the heterogeneous Fenton device by using an external magnetic field to separate the catalyst from the reaction solution.

In the method according to the present application, the softener used in step 5 for softening the concentrated water is $Na_2CO_3$.

In the method according to the present application, the effluent from step 6 is treated with a multi-effect evaporator to produce industrial NaCl.

The present application provides a device for implementing the method, comprising:

a regulation and sedimentation tank connected to a feeding box, wherein the regulation and sedimentation tank is equipped with an agitator inside, and the regulation and sedimentation tank also owns a raw water inlet and a sediment outlet, and wherein the regulation and sedimentation tank is connected to a water reservoir via a pump and a flowmeter;

a water reservoir connected to a heterogeneous Fenton apparatus via a pump and a flowmeter, wherein the heterogeneous Fenton apparatus is connected to a feeding box and is equipped with an agitator inside, an electromagnetic field is disposed at the bottom of the heterogeneous Fenton apparatus and the heterogeneous Fenton device is connected to an anaerobic ammonia oxidation apparatus via a pump;

an anaerobic ammonia oxidation apparatus connected to a submerged MBR system via a pump, wherein an outlet of the submerged MBR system is connected to a security filter via a pump, and a water outlet of the security filter is connected to a RO system; wherein the effluent that is treated in the RO system and meets the standard is used as circulating cooling water; a concentrated water outlet of the RO system is connected to a integrated softening-coagulating-precipitating system, wherein the integrated softening-coagulating-precipitating system is connected to a feeding box via a flowmeter and a pump, and wherein a water outlet of the integrated softening-coagulating-precipitating system is connected to a NF system, the effluent water treated in the NF system is connected to a multi-effect evaporator, a concentrated water of the NF system is returned to the regulation and sedimentation tank via a pump and a flowmeter.

In the device according to the present application, the anaerobic ammonia oxidation apparatus is a full closed container and a plurality of sampling ports are provided on the side wall, an exhaust port is provided on the top, and a water outlet and a circulating cooling water outlet are provided on the upper part, a circulating cooling water inlet is provided at the lower part, a water inlet is provided at the bottom, an aeration head is provided above the water inlet, and a stirring paddle is provided above the aeration head.

The anaerobic ammonia oxidation apparatus is filled with anaerobic ammonia oxidation (anammox) granular sludge, and the outer layer of the granular sludge is an aerobic layer, and the inner layer thereof is an anaerobic layer, which can accomplish the autotrophic denitrification process in the anaerobic ammonia oxidation apparatus.

Graphite counter electrode, carbon felt working electrode and reference electrode are installed in the anaerobic ammonia oxidation apparatus, and the graphite counter electrode, the carbon felt working electrode and reference electrode are all connected to a potentiostat;

A pH online controller set in the anaerobic ammonia oxidation apparatus is used to monitor the pH value in the apparatus in real time and to adjust the pH value in the anaerobic ammonia oxidation apparatus by adding HCl or $NaHCO_3$.

In the device according to the present application, the aeration head is subjected to a denitrification reaction by contacting through a perforated baffle disposed above the aeration head with the anaerobic ammonia oxidation granular sludge.

In the device according to the present application, a sponge packing is provided between the granular sludge and the water outlet.

In the device according to the present application, the pump is a centrifugal pump and the stirring paddle is a mechanical stirring paddle.

The present application can accomplish the treatment and recycling of high-salt, high-ammonia nitrogen, high-concentration refractory organic wastewater, and has the characteristics of wide application range, high pollutant degradation efficiency, and easy salinity recovery and utilization.

DETAILED DESCRIPTION

Figure 1:
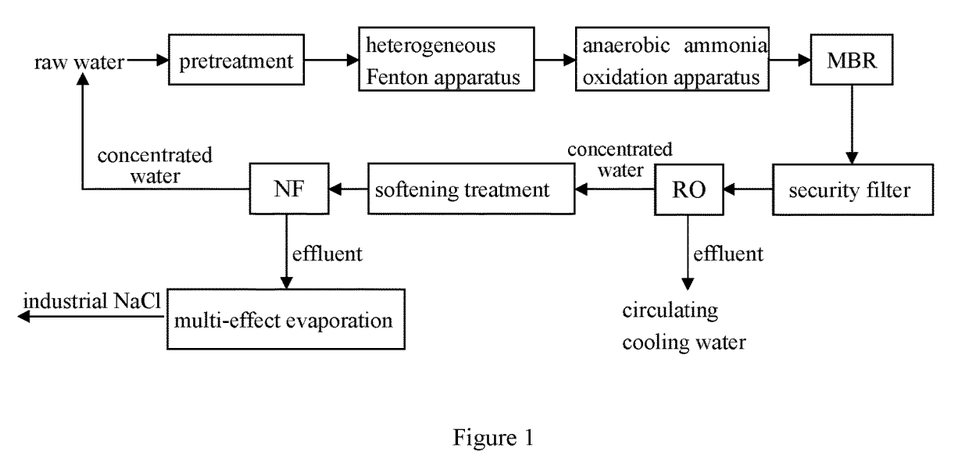
FIG. 1 is a schematic flow chart of the present application.

See FIG. 1. The combined process, "Pretreatment→Heterogeneous Fenton reaction→Anaerobic Ammonia Oxidation→MBR→Security filter→RO concentrated water Softening treatment→Nanofiltration→Multi-effect evaporation", disclosed in the present application comprising:

1) Pretreatment: After the raw water flows into a regulation and sedimentation tank, polyacrylamide is added. The reaction time is 4 hours. The sediment and water are separated in the tank and the effluent flows into the water reservoir. The sludge produced during the sedimentation process is sent to the sludge treatment station for processing.

2) Heterogeneous Fenton reaction: The pretreated water after pH adjustment is pumped into a heterogeneous Fenton apparatus. The reaction system inside the apparatus consists of a catalyst and $H_2O_2$. The catalyst is composed of Hangjin clay-supported nano-$Fe_3O_4$, and the nano-$Fe_3O_4$ particles are evenly distributed on the surface and in the pore of Hangjin clay in a monodispersed form, which can avoid the aggregation of particles and can also expand the contact area with wastewater and improve the reaction efficiency. A feeding box is connected to the top of the apparatus to replenish the consumed $H_2O_2$ into the reaction system. There is a mechanical agitator inside the apparatus for uniformly mixing the wastewater with $H_2O_2$ and the catalyst. At the bottom there is an additional electromagnetic field. After the reaction, a magnetic field is formed by energization, and the catalyst is adsorbed on the bottom of the device by magnetic effect. After that, the apparatus starts to drain, and the effluent water flows into the anaerobic ammonia oxidation apparatus. After the drainage is completed, the adsorbed catalyst is discharged from the sludge outlet. The reaction mechanism of this apparatus is: Nano-$Fe_3O_4$ loaded on Hangjin clay reacts with $H_2O_2$ to generate HO., and the generated HO. reacts with refractory organics in the wastewater to convert it into easily degradable small molecule organics and remove most COD. The reaction conditions are as follows: the pH value is between 6.5-7.5; the influent COD concentration is between 2000-5000 mg/L; the molar ratio of $H_2O_2$ to the catalyst is between 1:1-1:1.5; and the temperature is 25-35° C.; the reaction time is 2-4 hours; the effluent COD drops to 350-900 mg/L.

3) Anaerobic Ammonia Oxidation: After the wastewater is treated with heterogeneous Fenton-catalyzed oxidation, a large amount of refractory and toxic organics is removed, therefore the effluent has no toxicity to the anammox bacteria. The influent COD concentration is lower than ammonia nitrogen. In anoxia condition, anammox bacteria cause $NO_2^-$—N to react with $NH_4^+$—N to produce $N_2$ to denitrify. The anammox bacteria within the device are acclimated with the salinity of 3%-10% and are able to tolerate higher salinity. Anaerobic ammonia oxidation apparatus has fully enclosed structure, and the bottom of the apparatus is filled with anaerobic ammonia oxidation granular sludge; the top of the apparatus is affixed with polyethylene sponge as filler; the middle of the apparatus is equipped with a three-electrode system, wherein the carbon felt is used as working electrode, and the graphite flake is used as counter electrode, and the saturated calomel electrode is used as reference electrode. The apparatus is equipped with internal stirring paddles and pH on-line controllers to ensure that the wastewater and granular sludge are fully mixed, and that the pH value of the apparatus is monitored in real time. The apparatus has an outer circulating water bath to ensure the required temperature for the reaction. The reaction conditions are as follows: the pH value is between 6.5-7.5; the residence time is between 5-15 h; the temperature is between 30-35° C.; the working voltage is between −0.1 and =0.02V; the influent $NH_4^+$—N concentration is between 800-1500 mg/L; the aeration rate is 0.8-1.5 L/min; and the agitation speed of stirring paddle is about 12 rpm; and the denitrification rate is more than 90%. The effluent of heterogeneous Fenton apparatus is pumped from the bottom of the anaerobic ammonia oxidation apparatus and discharged from the top outlet at the end of the reaction. The $N_2$ produced by the reaction is discharged from the top gas exhaust port. After the reaction is completed, the effluent is discharged from the top into the MBR system, and the sludge is discharged intermittently. When the sludge volume exceeds 90% of the bottom volume, the sludge needs to be discharged, and every disposal of sludge is between 1% and 5% of the total sludge volume.

4) MBR (Membrane Bio-Reactor, Membrane Bioreactor): After the wastewater flows into the MBR, small molecular organic compounds are further biochemically degraded by biodegradation and retention of the high-concentration activated sludge, and part of the suspended solids is also retained. The submerged MBR apparatus is used to treat the effluent from the anaerobic ammonia oxidation apparatus. Hollow-fiber ultrafiltration membranes are installed inside the MBR apparatus and the operating conditions are optimized by using continuous or intermittent aeration.

5) Security filter: The function of the security filter is to retain the particles having a particle diameter of more than 5 μm from the MBR effluent to prevent the particles from scratching the RO membrane (Reverse Osmosis membrane) after being accelerated by the high pressure pump.

6) RO: The effluent water from the security filter flows into the RO membrane module to remove most of the soluble salts, small molecules of soluble organics and so on. Under sufficient pressure, the effluent water produced by the influent water passing through the reverse osmosis membrane can be used as circulating cooling water in the process of production.

7) Softening treatment: Due to the effect of concentration, the COD concentration and hardness of RO concentrated water are relatively high. To prevent clogging of the membrane, RO concentrated water must be softened in an integrated softening-coagulating-precipitating system. Such equipment includes a concentric turbulent mixer, a new turbulent flocculation apparatus and a variable-runner ramp inclined plate sedimentation unit. In the equipment, softening, flocculation and sedimentation treatment are performed by adding $Na_2CO_3$ and polyacrylamide.

8) Nanofiltration: After the RO concentrated water flows into the NF system, divalent and multivalent ions and various types of substances having a molecular weight of greater than 200 Da are removed. The effluent content is mainly NaCl.

9) Multi-effect evaporation: The main component of NF effluent is NaCl, which flows into the multi-effect evaporation system to produce industrial NaCl. The NF concentrated water mainly contains soluble silicon, $Na_2SO_4$, and soluble organics, and is directly returned to the pretreatment process.

The high-salt, high-ammonia nitrogen, and high-concentration refractory organic wastewater in the present application has a salinity of 3%-10%, an ammonia nitrogen concentration of 1000-2500 mg/L, and a COD concentration of 2000-5000 mg/L.

The device of the present application will be further described below with reference to the accompanying drawings and specific embodiments.

Figure 2:
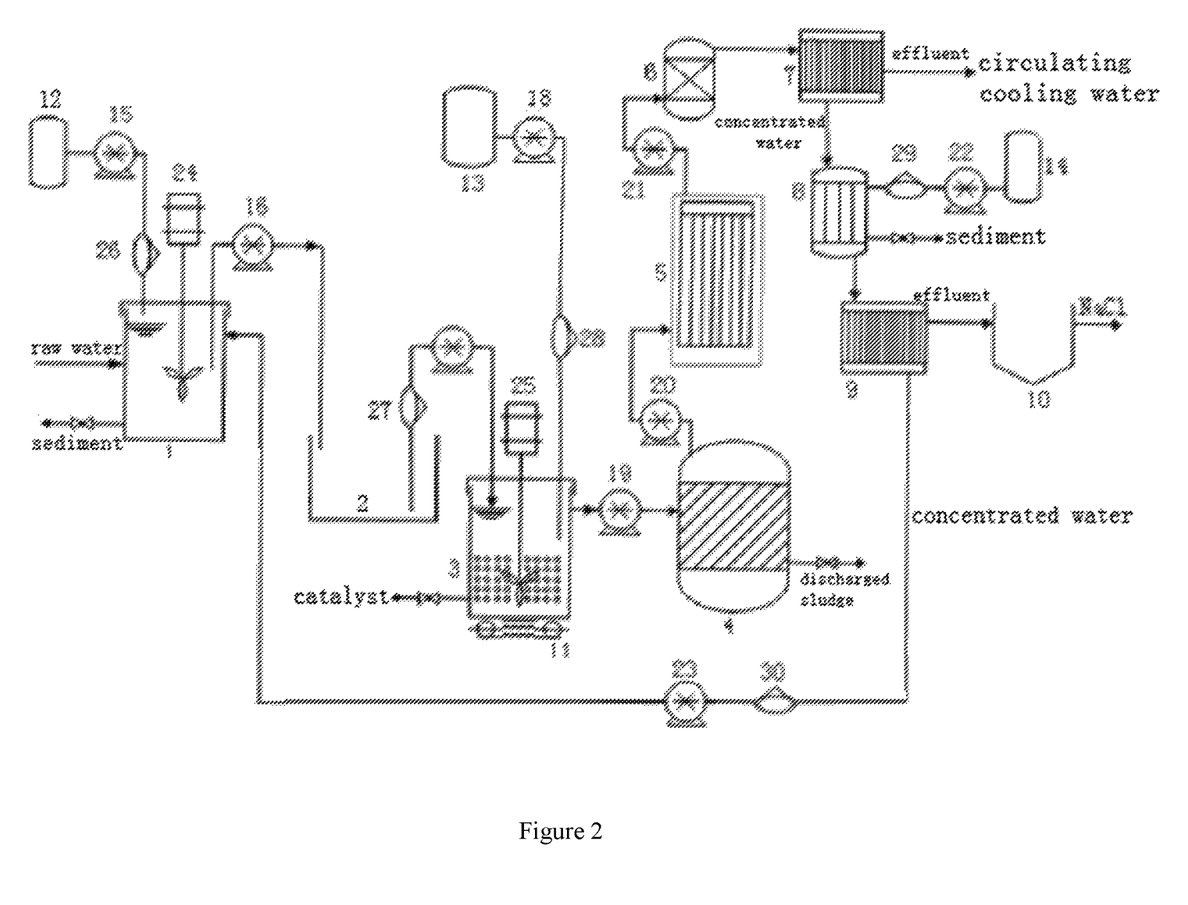
FIG. 2 is a schematic diagram of the device according to the present application.

The device for treating high-salt, high-ammonia nitrogen and high-concentration refractory organic wastewater as shown in FIG. 2 includes: a regulation and sedimentation tank 1, a water reservoir 2, a heterogeneous Fenton apparatus 3, an anaerobic ammonia oxidation apparatus 4, a submerged MBR 5, a security filter 6, a RO system 7, a integrated softening-coagulating-precipitating system 8, a NF system 9, a multi-effect evaporator 10, an electromagnetic field 11, feeding box 12-14, centrifugal pump 15-23, mechanical agitator 24-25, and flowmeter 26-30. The regulation and sedimentation tank 1 and the feeding box 12 are connected via a pipeline, a centrifugal pump 15 and a flowmeter 26; the regulation and sedimentation tank 1 is internally installed with a mechanical agitator 24; the regulation and sedimentation tank 1 is connected to a water reservoir 2 via a pipeline and a centrifugal pump 16; the water reservoir 2 is connected to a heterogeneous Fenton apparatus 3 via a pipeline, a flowmeter 27 and a centrifugal pump 17; the heterogeneous Fenton apparatus 3 is connected to the feeding box 13 via a pipeline, a centrifugal pump 18 and a flowmeter 28, the heterogeneous Fenton apparatus 3 is internally installed with a mechanical agitator 25; the heterogeneous Fenton apparatus 3 is connected to an anaerobic ammonia oxidation apparatus 4 via a pipeline and a centrifugal pump 19; an electromagnetic field 11 is disposed at the bottom of the heterogeneous Fenton apparatus 3; the anaerobic ammonia oxidation apparatus 4 is connected to a submerged MBR system 5 via a pipeline and a centrifugal pump 20; the submerged MBR system 5 is connected to a security filter 6 via a pipeline and a centrifugal pump 21; the security filter 6 is connected to a RO system 7 via a pipeline; the RO system 7 is connected to a integrated softening-coagulating-precipitating system 8 via a pipeline; the integrated softening-coagulating-precipitating system 8 is connected to a feeding box 14 via a pipeline, a flowmeter 29 and a centrifugal pump 22; the integrated softening-coagulating-precipitating system 8 is connected to a NF system 9 via a pipeline; the NF system 9 is connected to a multi-effect evaporator 10 via a pipeline; and the NF system 9 is connected to the regulation and sedimentation tank 1 via a pipeline, a centrifugal pump 23 and a flowmeter 30.

Figure 3:
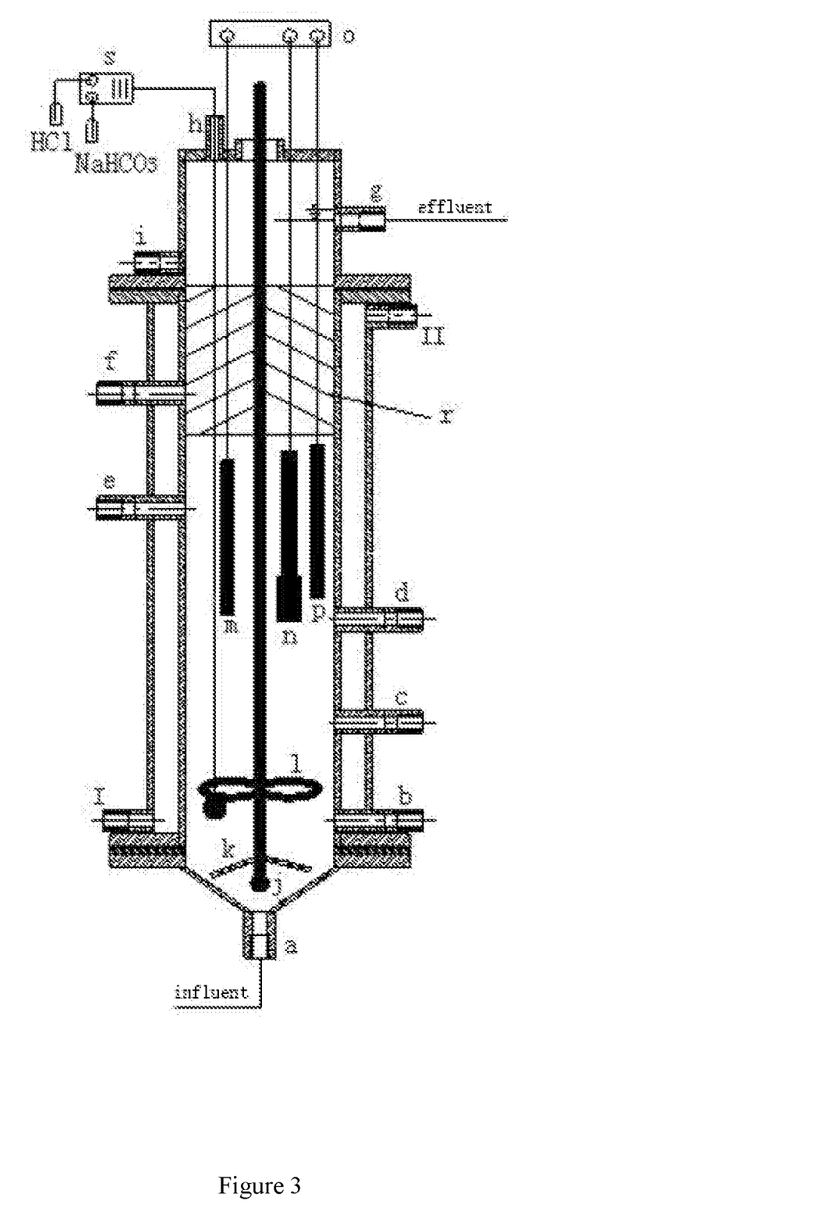
FIG. 3 is a schematic diagram of an anaerobic ammonia oxidation apparatus used in the present application.

As shown in FIG. 3, the anaerobic ammonia oxidation apparatus 4 is a cylindrical reactor mainly composed of circulating water bath inlet I, circulating water bath outlet II, water inlet a, sludge outlet b, sampling port c-f, water outlet g, gas exhaust port h, sampling port i, aeration head j, perforated baffle k, stirring paddle l, graphite electrode m, carbon felt electrode n, potentiostat o, reference electrode (saturated calomel electrode) p, sponge packing r, and pH online controller s.

The present application includes the following steps when using the above device for advanced treatment of high-salt, high-ammonia nitrogen, high-concentration refractory organic wastewater:

1) Pretreatment: After the raw water flows into a regulation and sedimentation tank 1, polyacrylamide is added by the feeding box 12 through the centrifugal pump 15, wherein the feeding amount is controlled by the flowmeter 26, and the reaction time is 4 hours. The regulation and sedimentation tank 1 is internally installed with a mechanical agitator 24 to control the reaction speed. The sediment and water are separated in the tank. The sediment is discharged from the sludge discharging pipeline, and the effluent flows into the water reservoir 2 through the centrifugal pump 16.

2) Heterogeneous Fenton reaction: The pretreated effluent is pumped into a heterogeneous Fenton apparatus 3. The top of the heterogeneous Fenton apparatus 3 is connected to the feeding box 13, and the $H_2O_2$ solution is added to the apparatus through the centrifugal pump 18, wherein the feeding amount is controlled by the flowmeter 28. In the heterogeneous Fenton apparatus 3, it has a heterogeneous Fenton system composed of Hangjin clay supported nano-$Fe_3O_4$ and $H_2O_2$. The wastewater undergoes a catalytic oxidation reaction in the system, in which the macromolecular hard-to-degrade organic materials are converted into small molecules and thereby is removed. The heterogeneous Fenton apparatus 3 is internally installed with a mechanical agitator 25 to ensure uniform reaction. At the bottom of the heterogeneous Fenton apparatus 3, an electromagnetic field 11 is provided. After the reaction is completed, the magnetic field is energized to form a magnetic field, and with the help of a magnetic effect, the catalyst (nano-$Fe_3O_4$ loaded on Hangjin clay) is adsorbed on the bottom. After that, the heterogeneous Fenton apparatus 3 starts to drain, and the effluent flows into the anaerobic ammonia oxidation apparatus 4 through the centrifugal pump 19, and the adsorbed catalyst is discharged from the sludge outlet after the drainage is completed. The reaction conditions are as follows: the pH value is between 6.5-7.5; the influent COD concentration is between 2000-5000 mg/L; the molar ratio of $H_2O_2$ to the catalyst is between 1:1-1:1.5; and the temperature is 25-35° C.; the reaction time is 2-4 hours; the effluent COD drops to 350-900 mg/L. After wastewater is treated by heterogeneous Fenton oxidation, the species of organic matters are greatly reduced, and difficult-to-degrade highly toxic substances such as aromatic compounds, heterocyclic compounds, and organic chlorides are mostly removed or decomposed into low molecular weight organic substances.

3) Anaerobic Ammonia oxidation apparatus: After the effluent of the heterogeneous Fenton apparatus 3 flows into the anaerobic ammonia oxidation 4 through the centrifugal pump 19, the denitrification reaction is performed under the action of anammox bacteria that has been high-salinity acclimated. The reaction conditions are as follows: the pH value is between 6.5-7.5; residence time is between 5-15 h; the temperature is between 30-35° C.; the working voltage is −0.1 to −0.02V; the influent $NH_4^+$—N concentration is between 800-1500 mg/L; the aeration rate is 0.8-1.5 L/min; and the agitation speed of stirring paddle is about 12 rpm; and the denitrification rate is more than 90%. The sludge is discharged intermittently. When the sludge volume exceeds 90% of the bottom volume, the sludge starts to be discharged, and every disposal of sludge is between 1% and 5% of the total sludge volume.

As shown in FIG. 3, the anaerobic ammonia oxidation apparatus 4 has a cylindrical fully enclosed structure, and the bottom is filled with anaerobic ammonia oxidation granular sludge after cultivation and acclimation, and the outer layer of the granular sludge is an aerobic layer and the inner layer is an anaerobic layer. The autotrophic denitrification process can be carried out in the anaerobic ammonia oxidation apparatus 4. The effluent of the heterogeneous Fenton apparatus 3 flows into the anaerobic ammonia oxidation apparatus 4 from the water inlet a, and contacts with the anaerobic ammonia oxidation granular sludge through the perforated baffle k to cause a denitrification reaction. The aeration head j at the bottom of the anaerobic ammonia oxidation apparatus 4 converts the ammonia nitrogen in the wastewater into nitrous nitrogen by controlling the aeration amount; the stirring paddle 1 inside the anaerobic ammonia oxidation apparatus 4 is used to evenly mix the wastewater with anaerobic ammonia oxidation granular sludge. The three-electrode system composed of the graphite counter electrode m, the carbon felt working electrode n, the reference electrode p, and the potentiostat o inside the anaerobic ammonia oxidation apparatus 4 can effectively improve the activity of the anammox bacteria and reduce the nitrate nitrogen into nitrite nitrogen to increase the denitrification efficiency. The pH online controller s inside the anaerobic ammonia oxidation apparatus 4 is used to monitor the pH change in the anaerobic ammonia oxidation apparatus 4 in real time and to adjust the pH value by adding HCl or $NaHCO_3$. The wastewater reacted with the anaerobic ammonia sludge granular sludge is filtered through sponge packing r and discharged from the water outlet g. $N_2$ produced by the reaction is discharged from the exhaust port h. The denitrification inside the anaerobic ammonia oxidation apparatus 4 is monitored by sampling at the sampling ports c-f and i. The sludge is discharged from the sludge outlet b at the bottom of the anaerobic ammonia oxidation apparatus 4. A circulating water bath inlet I and an outlet II is provided outside the anaerobic ammonia oxidation apparatus 4, and the reaction temperature inside the anaerobic ammonia oxidation apparatus 4 is ensured by connecting a circulating water bath system.

Cultivation and acclimation of anaerobic ammonia oxidation granular sludge:

① Inoculating the reactor with anaerobic ammonia oxidation granular sludge;

② Filling the artificial wastewater with nitrogen so that the DO concentration in the wastewater is 0 mg/L and the pH is adjusted to 7-8; the artificial wastewater composition is as follows:

$NH_4^+$—N 100 mg/L, $NO_2^-$—N 100 mg/L, $KHCO_3$ 1.5-2.0 g/L, NaCl 10 g/L, $KH_2PO_4$ 54 mg/L, $FeSO_4.7H_2O$ 9 mg/L, EDTA 5 mg/L, Trace elements 1 mL/L; the composition of the trace elements: $CuSO_4.5H_2O$ 0.25 mg/L, $ZnSO_4.7H_2O$ 0.43 mg/L, $CoCl_2.6H_2O$ 0.24 mg/L, $MnCl_2.4H_2O$ 0.99 mg/L, $NaMoO_4.2H_2O$ 0.22 Mg/L, $NiCl_2.6H_2O$ 0.19 mg/L, $NaSeO_4$ 0.11 mg/L, $H_3BO_3$ 0.014 mg/L;

③ Using the carbon felt as the working electrode, the graphite flake as the counter electrode, and the saturated calomel electrode as the reference electrode. An external electric field can effectively increase the activity of anammox bacteria and shorten the start-up time. In addition, the electrons generated by the applied electric field can also reduce $NO_3^-$—N, which is a by-product of anaerobic ammonia oxidation reaction, and contribute to increase the denitrification efficiency of the system.

④ Increasing the total nitrogen concentration in artificial wastewater and reducing the hydraulic retention time, and gradually increasing the influent load;

⑤ After the reaction is stable, the DO concentration in artificial wastewater is gradually increased to cultivate bacteria that can consume oxygen in the reactor;

⑥ After cultivation and acclimation, facultative bacteria adsorbed on the outer layer of anaerobic ammonia oxidation granular sludge can consume dissolved oxygen in the reactor and create anaerobic conditions for the anaerobic ammonia oxidation reaction inside the granular sludge.

⑦ Inoculating the reactor with nitrifying bacteria, and appropriately reducing the nitrite nitrogen concentration in the artificial wastewater, and meanwhile, simultaneously aerating the reactor with a controllable aeration rate to convert the ammonia nitrogen in the artificial wastewater into nitrite nitrogen;

⑧ The pH in the reactor is monitored online and the pH in the reactor is controlled between 7.5-8.0 by the addition of HCl or $NaHCO_3$;

⑨ After acclimation, partial nitrifying bacteria are successfully attached to the outer surface of anaerobic ammonia oxidation granular sludge, forming a granular sludge having an outer aerobic layer and an inner anaerobic layer, and the process of efficient startup of the autotrophic denitrification reactor is accomplished.

⑩ The addition of polyethylene sponge packing, on one hand, allows the attachment of part of the granular sludge to improve the denitrification efficiency of the reactor; on the other hand, it can also effectively prevent the outflow of sludge.

After the reactor is successfully started, the influent water is changed to high-salt, high-ammonia nitrogen, and high-concentration refractory organic wastewater.

4) MBR: The apparatus is an immersed MBR system. After the effluent of the anaerobic ammonia oxidation apparatus 4 flows into the MBR system 5 through the centrifugal pump 20, the organic matter is further removed and denitrified by the biodegradation and retention of the activated sludge having a high concentration.

5) RO: The MBR effluent passes through the centrifugal pump 21 and flows into the security filter 6 to retain particles having a particle size greater than 5 μm. The water from the security filter flows into the RO system 7. Under the action of the high-pressure pump, cross-flow filtration is performed along the membrane surface. Almost all ions are trapped by the RO membrane. The effluent is ion-free water and can be used as circulating cooling water in the process of production. The RO concentrated water flows into the subsequent process for continue processing.

6) NF: The RO concentrated water first flows into the integrated softening-coagulating-precipitating system 8, and the feeding box 14 feeds $Na_2CO_3$ and polyacrylamide into the system through the centrifugal pump 22, and the dosage is controlled by the flowmeter 29. Wastewater, softeners and flocculants are turbulently mixed in the system. The sedimentation design stays for 2 hours and the effluent flows into the NF system 9. The bivalent $SiO_3^{2-}$ and $SO_4^{2-}$ are trapped to generate NF concentrated water. The resulting NF concentrated water returns to the regulation and sedimentation tank 1 via the centrifugal pump 23, and the flow rate is controlled by the flowmeter 30. The NF effluent mainly contains NaCl and flows into the multi-effect evaporator 10 to evaporate and recover NaCl.

EXAMPLES

The present application is illustrated by taking the following salty wastewater of a coal chemical company as an example:

The wastewater comes from effluent wastewater of condensate of syngas generated by coal gasification. The water quality of the wastewater is as follows: pH 7.5-8.2, COD 3000-4800 mg/L, $NH_4^+$—N 1600-2300 mg/L, salinity 6%-8%, phenol content 420-810 mg/L.

This example is completed by using the device of the present application.

1. Pretreatment

The wastewater was pumped into the regulation and sedimentation tank, and 0.5% polyacrylamide solution was added after filling-up. The input ratio was 2 kg polyacrylamide per m³ wastewater, and the suspended solids and colloidal substances were removed. Precipitated effluent flowed into heterogeneous Fenton apparatus.

2. Heterogeneous Fenton Apparatus

The catalyst was nano-$Fe_3O_4$ loaded on Hangjin clay. The catalyst was prepared by the method comprising the following steps: $FeCl_3.6H_2O$, $FeCl_2.4H_2O$ and hydrochloric acid solution were mixed at a molar ratio of 2:1:1, and hydrochloric acid was slowly added to deoxidized water to form an acidic solution; $FeCl_3.6H_2O$ and $FeCl_2.4H_2O$ were dissolved in the solution, and after they were completely dissolved, the solution was filled to 100 ml with deoxygenated water. 5 g of Hangjin clay was weighed and 150 ml of stronger ammonia water was added under constant stirring so that the Hangjin clay in the solution completely stayed in a suspension state. The above-prepared $Fe^{2+}/Fe^{3+}$ solution was added dropwise thereto, and $N_2$ was introduced to remove the oxygen at the same time. At this point there was a black suspension. After the addition was completed, stirring was continued for aging for 20 minutes. The solid-liquid separation was performed under an external magnetic field. After repeated washing with deoxygenated water for 3 times, the mixture was vacuum-dried at 60° C. for 12 hours and stored without air.

The effluent from the pretreatment process flowed into the heterogeneous Fenton apparatus and $H_2O_2$ solution was added thereinto with constant stirring. The molar ratio of $H_2O_2$ to catalyst was 1:1; the temperature was 25° C.; the reaction time was 2 hours; the COD removal rate was between 83% and 85%; the effluent COD content dropped to 450-810 mg/L; the phenol removal rate was 85%-93%, and the effluent phenol content dropped to 30-80 mg/L. The resulting effluent flowed into the anaerobic ammonia oxidation apparatus.

3. Anaerobic Ammonia Oxidation Apparatus

The wastewater flowed into from the bottom of the anaerobic ammonia oxidation apparatus and was fully mixed with the anaerobic ammonia oxidation sludge. The reaction conditions were controlled as follows: the pH was between 6.5-7.5; the residence time was between 5-15 hours; and the temperature was between 30-35° C.; the working voltage was between −0.1 and −0.02V; influent $NH_4^+$—N concentration was between 800-1500 mg/L; aeration volume was 0.8-1.5 L/min; the agitation speed of stirring paddle was about 12 rpm. After the reaction, the effluent $NH_4^+$—N dropped to 150-220 mg/L and the COD dropped to 220-400 mg/L. The resulting effluent flowed into the MBR system.

4. MBR

The wastewater flowed into the MBR system and was subjected to biodegradation and retention of high-concentration activated sludge to further remove organic matter and to denitrify. The effluent COD was less than 50 mg/L and the $NH_4^+$—N was less than 5 mg/L.

5. Security Filter

The wastewater first flowed into the security filter to remove particles having a particle diameter of more than 5 μm. The resulting effluent flowed into the RO system.

6. RO System

The wastewater flowed into the RO system and was subjected to the desalinization treatment, resulting in a desalination rate of over 99%. The produced water almost did not contain any ions and can be reused as circulating cooling water. The concentration of salt in concentrated water was between 10% and 25%, and the contents of Ca and Mg ions were between 480-560 mg/L and 55-70 mg/L, respectively. The concentrated water directly flowed into the softening treatment process.

7. Softening Treatment

The wastewater first flowed into the integrated softening-coagulating-precipitating system, and $Na_2CO_3$ and polyacrylamide were added. The input ratios were 3 kg of sodium carbonate per m³ wastewater and 2 kg of polyacrylamide per m³ wastewater, respectively. After softening-coagulating-precipitating treatment, the removal rate of Ca and Mg ions in the wastewater was above 85%.

8. NF system

The wastewater flowed into the NF system and a large amount of divalent ions was trapped. The NaCl content in the effluent water accounted for 90% of the total amount of ions. The resulting effluent flowed into the evaporation apparatus and the concentrated water returned to the pretreatment process.

9. Evaporator

Evaporation was used to recover NaCl in the effluent of NF. The purity of NaCl was above 85%.

The invention claimed is:

1. A method for treating and recycling organic wastewater, comprising:
   (1) pretreating the organic wastewater and adding flocculant to remove suspended solids and colloidal substances in the water;
   (2) subjecting an effluent obtained after pretreatment in Step (1) to a heterogeneous Fenton reaction with Hangjin clay-supported nano-$Fe_3O_4$ as a catalyst, separating the catalyst from a reaction solution after the completion of the reaction, and subjecting the reaction solution to a reaction to remove COD;
   (3) subjecting an effluent obtained in Step (2) to an anaerobic ammonia oxidation reaction to remove nitrogen by the reaction of ammonia nitrogen and nitrite nitrogen;
   (4) subjecting an effluent obtained in Step (3) to an aerobic microbial decomposition and ultrafiltration membrane separation to further remove COD and ammonia nitrogen;
   (5) filtering an effluent obtained in Step (4) to remove large particles;
   (6) supplying an effluent obtained in Step (5) to an RO system, and using an effluent from the RO system as circulating cooling water while subjecting the concentrated water from the RO system to a softening treatment; and
   (7) supplying the softened concentrated water obtained in Step (6) to an NF system for treatment, evaporating an effluent obtained after the treatment to recover NaCl, and returning the resulting concentrated water to Step (1).

2. The method according to claim 1, wherein the organic wastewater in Step (1) has a salinity of 3%-10%, an ammonia nitrogen concentration of 1000-2500 mg/L, a COD concentration of 2000-5000 mg/L, and wherein the flocculant is polyacrylamide.

3. The method according to claim 1, wherein the pH of the heterogeneous Fenton reaction in Step (2) is between 6.5 and 7.5; the nano-$Fe_3O_4$ particles in the catalyst are evenly distributed on the surface and in the pore of Hangjin clay in a monodispersed form; after completing the Fenton reaction of Step (2), the catalyst is concentrated at the bottom of the heterogeneous Fenton apparatus by using an external magnetic field to separate the catalyst from the reaction solution.

4. The method according to claim 1, wherein the nitrite nitrogen in Step (3) is derived from the nitrosation of ammonia nitrogen and the reduction of nitrate nitrogen by a three-electrode system.

5. The method according to claim 1, wherein the softener used for softening the concentrated water in Step (6) is $Na_2CO_3$.

6. The method according to claim 1, wherein the effluent from Step (7) is treated with a multi-effect evaporator to produce industrial NaCl.

7. A device for treating and recycling organic wastewater, the device comprising:
   a regulation and sedimentation tank connected to a first feeding box, wherein the regulation and sedimentation tank is equipped with a first agitator inside, and the regulation and sedimentation tank being further equipped with a raw water inlet and a sediment outlet;
   a water reservoir connected to the regulation and sedimentation tank by a first pump and a first flowmeter, the water reservoir being further connected to a heterogeneous Fenton apparatus via a second pump and a second flowmeter, wherein the heterogeneous Fenton apparatus is connected to a second feeding box and is equipped with a second agitator inside, and wherein an electromagnetic field is disposed at the bottom of the heterogeneous Fenton apparatus;
   an anaerobic ammonia oxidation apparatus connected to the heterogeneous Fenton and further connected to a submerged MBR system via a third pump, wherein a first water outlet of the submerged MBR system is connected to a security filter via a fourth pump, and a second water outlet of the security filter is connected to a RO system; wherein an effluent that is treated in the RO system and meets the standard is used as circulating cooling water; a concentrated water outlet of the RO system is connected to an integrated softening-coagulating-precipitating system, wherein the integrated softening-coagulating-precipitating system is connected to a third feeding box via a third flowmeter and a fifth pump, and wherein a third water outlet of the integrated softening-coagulating-precipitating system is connected to an NF system, the effluent water after the NF system treatment is connected to a multi-effect evaporator, a concentrated water outlet of the NF system is returned to the regulation and sedimentation tank via a sixth pump and a fourth flowmeter.

8. The device according to claim 7, wherein the anaerobic ammonia oxidation apparatus is a fully closed container and a plurality of sampling ports are provided on the side wall, an exhaust port is provided on the top, and a water outlet and a circulating cooling water outlet are provided on the upper part, a circulating cooling water inlet is provided on the lower part, a water inlet is provided at the bottom, an aeration head is provide above the water inlet, and a stirring paddle is provided above the aeration head; and wherein the anaerobic ammonia oxidation apparatus is filled with anammox oxidation granular sludge, the outer layer of the granular sludge is an aerobic layer, and the inner layer thereof is an anaerobic layer, which can accomplish the autotrophic denitrification process in the anaerobic ammonia oxidation apparatus; and wherein graphite counter electrode, carbon felt working electrode and reference electrode are installed in the anaerobic ammonia oxidation apparatus, and wherein the graphite counter electrode, the carbon felt working electrode and reference electrode are all connected to a potentiostat;

wherein a pH online controller set in the anaerobic ammonia oxidation apparatus is used to monitor the pH value of the apparatus in real time and to adjust the pH value in the anaerobic ammonia oxidation apparatus by adding HCl or $NaHCO_3$.

9. The device according to claim 8, wherein the aeration head is subjected to a denitrification reaction by contacting through a perforated baffle disposed above the aeration head with the anaerobic ammonia oxidation granular sludge; and wherein a sponge packing is provided between the granular sludge and the water outlet.

10. The device according to claim 8, the stirring paddle is a mechanical stirring paddle.

11. The device according to claim 7, wherein the first, second, third, fourth, fifth or sixth pump is each a centrifugal pump.

* * * * *